United States Patent
Deyerler

(10) Patent No.: US 7,909,818 B2
(45) Date of Patent: Mar. 22, 2011

(54) JOINTED MIRROR ARM

(75) Inventor: Michael Deyerler, Hoehenkirchen-Siegertsbrunn (DE)

(73) Assignee: Linos Photonics GmbH & Co. KG, Goettingen (DE)

( * ) Notice: Subject to any disclaimer, the term of this patent is extended or adjusted under 35 U.S.C. 154(b) by 945 days.

(21) Appl. No.: 10/563,212

(22) PCT Filed: Apr. 15, 2005

(86) PCT No.: PCT/EP2005/004042
§ 371 (c)(1),
(2), (4) Date: Mar. 29, 2006

(87) PCT Pub. No.: WO2005/109064
PCT Pub. Date: Nov. 17, 2005

(65) Prior Publication Data
US 2007/0035794 A1 Feb. 15, 2007

(30) Foreign Application Priority Data
May 3, 2004 (DE) .................. 20 2004 007 134 U

(51) Int. Cl.
*A61B 18/18* (2006.01)
(52) U.S. Cl. .............................. 606/19; 606/17; 606/18
(58) Field of Classification Search .............. 606/16–19; 359/399, 403; 385/147
See application file for complete search history.

(56) References Cited

U.S. PATENT DOCUMENTS

| | | | |
|---|---|---|---|
| 3,407,302 A * | 10/1968 | Bouwers | 250/214 VT |
| 3,528,424 A * | 9/1970 | Ayres | 606/19 |
| 3,703,176 A * | 11/1972 | Vassiliadis et al. | 606/3 |
| 3,913,582 A * | 10/1975 | Sharon | 606/10 |
| 4,682,595 A * | 7/1987 | Hoerenz et al. | 606/4 |
| 4,865,441 A * | 9/1989 | Reis | 351/214 |
| 5,288,288 A * | 2/1994 | Lewis et al. | 606/14 |
| 5,397,327 A * | 3/1995 | Koop et al. | 606/17 |
| 5,558,666 A * | 9/1996 | Dewey et al. | 606/9 |
| 5,743,902 A * | 4/1998 | Trost | 606/18 |
| 6,513,962 B1 | 2/2003 | Mayshack et al. | |
| 6,626,895 B2 * | 9/2003 | Frey et al. | 606/10 |

FOREIGN PATENT DOCUMENTS

| | | |
|---|---|---|
| DE | 2229683 | 2/1974 |
| DE | 2930308 | 1/1981 |
| DE | 3641910 | 11/1987 |
| DE | 10027148 | 12/2001 |
| EP | 1389710 | 2/2004 |

* cited by examiner

*Primary Examiner* — Ahmed M Farah
(74) *Attorney, Agent, or Firm* — Jordan and Hamburg LLP

(57) ABSTRACT

A jointed mirror arm includes at least two tubular pieces, connected to each other by a joint with a reflecting mirror, which, as a result of the joint, may be arranged in varying configurations and which form a beam path for the radiation, with a fixed inlet on a first tube piece for the introduction of radiation from a stationary optical source and a position different from the position of the inlet for the outlet from the intermediate joint arm on a final tube piece for emitting said radiation. The jointed mirror arm is characterized in that a scanner for the radiation is arranged before the inlet into the intermediate jointed arm and an optical imaging system is provided in the at least two tube pieces of the intermediate jointed arm, for imaging the scanner after the output from the intermediate jointed arm.

8 Claims, 1 Drawing Sheet

JOINTED MIRROR ARM

BACKGROUND OF THE INVENTION

The invention relates to an jointed mirror arm, specifically an intermediate jointed arm with at least two tubular parts that are joined to one another via a joint having a tilted mirror and that are to be arranged at different solid angles to one another because of this joint and that form a beam path for the radiation, with a stationary inlet at a first tubular part for introducing radiation from a stationary optical source, and with any desired outlet site of the intermediate jointed arm that is different from the inlet site and that is on a last tubular part for the radiation outlet.

Such jointed mirror arms are known per se and are for transferring radiation, e.g. that of a laser, from a stationary source to a site of use that can vary in location, e.g., a handpiece on the end and downstream of the outlet of the jointed mirror arm on the last tubular piece, such as is the case e.g. during the use of lasers in dermatology, in dental technology, or during surgery. At the inlet a static radiation is coupled in the sense that the laser is arranged rigid with respect to the jointed mirror arm and its radiation is coupled into the latter; the deflection and change to the position of the exiting beam can be effected using moving and locationally displacing the outlet of the jointed mirror arm and/or of the endpiece e.g. the handpiece located there. Instead of this, it is also possible to deflect the beam by means of a scanner in the handpiece downstream of the jointed mirror arm.

It is disadvantageous in this that the beam deflection must be miniaturized in a complicated manner by means of the scanner and is also subjected to dynamic disturbances by the movement of the outlet of the jointed mirror arm and/or the handpiece.

BRIEF SUMMARY OF THE INVENTION

The object of the invention is to embody in a simpler manner and a manner less sensitive to interference a generic jointed mirror arm with beam deflection.

This object is inventively attained with a generic jointed mirror arm using its characterizing features in that a scanner for the radiation is arranged upstream of the inlet of the intermediate jointed arm and in that an optical imaging system forming the scanner is provided at a site downstream of the outlet of the intermediate jointed arm in the at least two tubular parts of the intermediate jointed arm.

In other words, in accordance with the invention the scanner is moved from the outlet or the handpiece into the static part upstream of the inlet of the jointed mirror arm and a physically extended image or aperture diaphragm e.g. of the scanner is optically imaged from the inlet through the beam path of the jointed mirror arm to its outlet.

In this manner the cross-section required by the scanned beam advantageously remains small, even at large transfer lengths. The scanner with respect to its size is also not subject to any limitations because it can be arranged with standard components upstream of the inlet of the jointed mirror arm without any structural limitations.

In one preferred further development of the invention, the imaging system can comprise one or a plurality of imaging stages, whereby each imaging stage is provided with at least two lenses having an intermediate focus therebetween.

Advantageously the joints with the tilted mirrors can be placed at any location in the beam path. It is useful that locations are preferred at which the tilted mirror is not at the site of an intermediate focal point in order to avoid focused spots on the tilted mirrors.

By rotating the joint of the jointed mirror arm the transferred image rotates. This means the coordinate allocation between inlet and outlet are lost. This is important in special applications (e.g. targeted approach of coordinates using XY scanners). The rotation of the transferred image can be measured and compensated using special image rotation optics, e.g. using marks. The following can be used as marks:
  a self-illuminating or illuminated structure
  a structure as above in the image field (point, line, etc.)
  a structure as above on the edge of the imaged field
  a structure as above on a radiation limiting surface (e.g. screen)
  a specific scanning position or scanning pattern
The measurement can be performed using the following listed measures:
  imaging of a mark using the jointed mirror arm
  measurement and evaluation of image orientation (image position of imaged structure)
  measurement of image position by means of position-sensitive detector
  measurement by means of individual detector e.g. for signal maximum
  measurement using control and regulation of an image rotation stage via aforesaid sensor signals.
In addition, the following additions can be made to the inventive jointed mirror arm.
  Use of measurement beam path and sensors for whole-system monitoring
  Control of the adjustment status of the jointed mirror arm.
  Safety switch for e.g. laser i.e., light e.g. of the arm disappears, also the monitor signal and then the light source (e.g. laser) can be turned off.

BRIEF DESCRIPTION OF THE DRAWINGS

Accompanying the specification are figures which assist in illustrating the embodiments of the invention, in which.

DETAILED DESCRIPTION OF THE INVENTION

Figure 1:
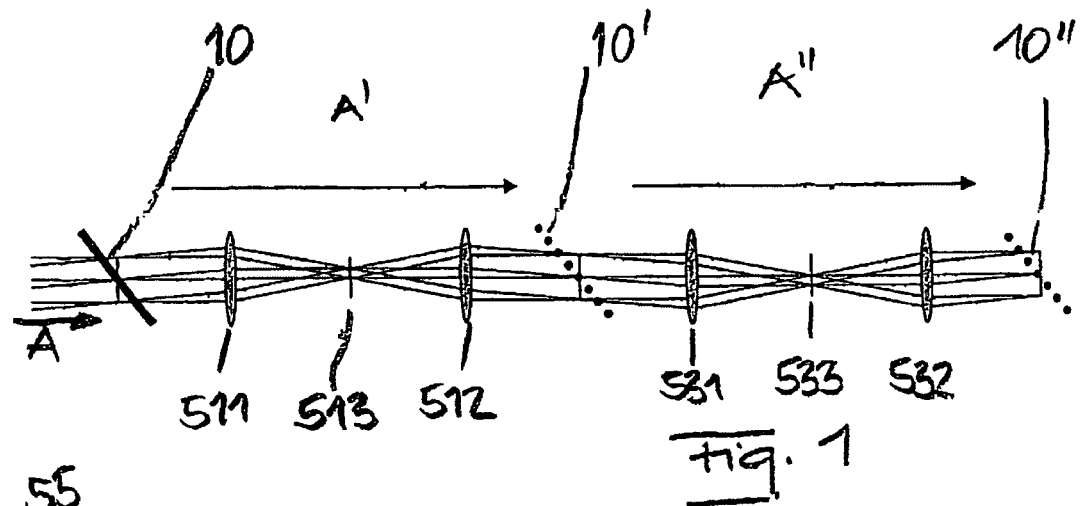
FIG. 1 is a schematic beam path in an jointed mirror arm.

FIG. 1 is a schematic illustration of an optical beam path, in this case a telecentric arrangement. A is the inlet-side radiation that strikes a real scanner. Downstream of this is an imaging stage of an imaging system A' with two lenses 511, 512 that form an intermediate focal point 513 therebetween. A scanner image 10' results downstream of this imaging stage A'. Downstream of this is an additional stage A" that also has two lenses 531 and 532 with an intermediate focal point 533 arranged therebetween. The scanner image 10" is arranged downstream thereof.

Figure 2:
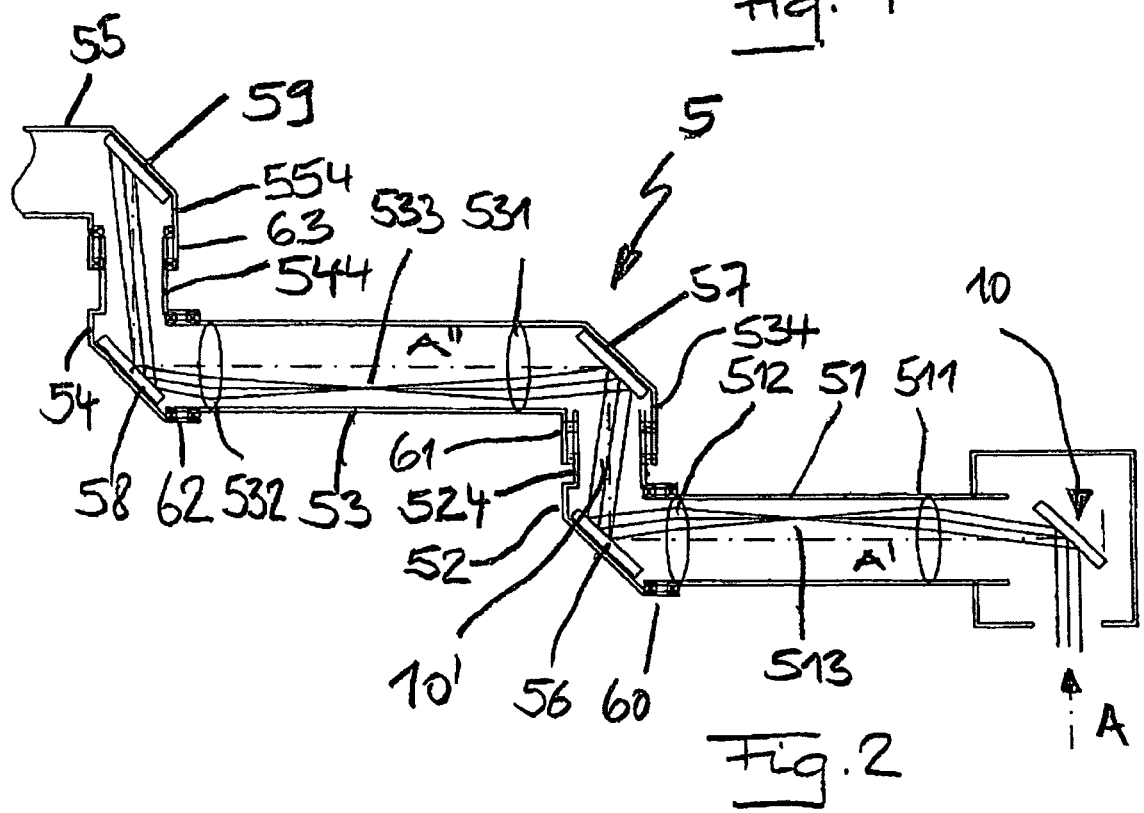
FIG. 2 is a schematic section of an jointed mirror arm with the beam path.

This schematic beam path in accordance with FIG. 1 will now be explained using a cross-section of an jointed mirror arm labeled 5 in FIG. 2. In it, A indicates the incoming radiation that strikes the stationary scanner and thus the beginning of the jointed mirror arm 5. Connected to the scanner 10 is the first tubular part 11 of the jointed mirror arm 5, in which the first imaging stage A' is arranged with the two lenses 511 and 512 that form an intermediate focal point 513.

Connected to the fixed tubular part 51 is a tubular part 52 that can be rotated via a bearing 60 and that has a mirror 56 that is arranged at a 45° angle with respect to the optical axis of the first tubular part 51. The connecting tubular support on the side of the tubular part 52 facing away from the first tubular part 51 runs to the mirror 56 at a 45° angle and perpendicular to the axis, that is, to the optical axis of the first imaging system's A' perpendicularly-running tubular axis and is itself provided at its free end with a bearing 61 on the tubular piece 524.

The tubular part 53 is likewise provided with a tubular section 534 that is arranged perpendicular to the extension of its axis and with which it can be rotated about the bearing 61. Provided between this tubular section 534 and the tubular part 53 running perpendicular thereto is an additional mirror 57 that is arranged at a 45° angle with respect to the two tubular axes.

This tubular part 53 has an additional imaging stage providing an optical image A" and with lenses 531 and 532 that form an intermediate focal point 533 therebetween and is provided at its rear end with another bearing 62.

Provided around this bearing is an additional tubular part 54 with a mirror 58 and a tubular section 544 that extends perpendicular to the axis of the tube 53 and located at the end of which is a last bearing 63.

Attached rotatable about this bearing is a tubular section 554 of the tubular part 55, the axis of which runs perpendicular to that of the tubular section 544 of the tubular part 54 and provided with a mirror 59 at a 45° angle to the two aforesaid axes.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A jointed mirror arm, comprising:
   at least two tubular parts;
   a joint joining adjacent tubular parts of said at least two tubular parts so that the adjacent tubular parts are disposed at different solid angles and form a radiation beam path;
   said joint including a tilted mirror;
   said at least two tubular parts including a first tubular part, said first tubular part including a stationary radiation inlet for introducing radiation from a stationary optical source; and
   said at least two tubular parts including a last tubular part, said last tubular part including a radiation outlet disposed downstream of said inlet in said radiation path;
   a scanner for scanning radiation, said scanner disposed upstream of said inlet;
   an optical imaging system forming an image from said scanner, said optical imaging system being disposed downstream of said outlet.

2. The jointed mirror arm of claim 1, wherein said imaging system comprises a plurality of imaging stages.

3. The jointed mirror arm of claim 2, wherein each of said imaging stages comprises at least two lenses having an intermediate focal point therebetween.

4. The jointed mirror arm of claim 3, wherein said lenses forming said imaging stage comprise a relay lens system.

5. The jointed mirror arm of claim 4, wherein no tilted mirror is arranged at locations of the beam path which include an intermediate focal point.

6. The jointed mirror arm of claim 5, further comprising image rotation optics for compensating image coordinate rotation.

7. The jointed mirror arm of claim 6, further comprising a measurement system for measuring said image coordinate rotation.

8. The jointed mirror arm of claim 7, further comprising a drive for controlling said image rotation optics responsive to measurements from said measurement system.

\* \* \* \* \*